(12) United States Patent
Fong

(10) Patent No.: US 7,246,911 B2
(45) Date of Patent: Jul. 24, 2007

(54) INSTRUMENT CLUSTER WITH HIDDEN TELLTALE INDICATORS

(75) Inventor: Ching Fong, Canton, MI (US)

(73) Assignee: Yazaki North America, Inc., Canton, MI (US)

( * ) Notice: Subject to any disclaimer, the term of this patent is extended or adjusted under 35 U.S.C. 154(b) by 291 days.

(21) Appl. No.: 10/960,423

(22) Filed: Oct. 7, 2004

(65) Prior Publication Data

US 2006/0083001 A1    Apr. 20, 2006

(51) Int. Cl.
*G01D 11/28*    (2006.01)
(52) U.S. Cl. .................. 362/29; 362/489; 362/812; 40/553; 40/564; 40/580; 116/334
(58) Field of Classification Search .............. 362/29, 362/30, 489, 812; 40/443, 564, 553, 580, 40/901; 116/334
See application file for complete search history.

(56) References Cited

U.S. PATENT DOCUMENTS

| | | | |
|---|---|---|---|
| 2,496,488 A | 2/1950 | Ohman | |
| 4,236,480 A | 12/1980 | Gröhl | |
| 4,417,411 A * | 11/1983 | Miyagishima et al. | ......... 40/443 |
| 4,841,155 A | 6/1989 | Ushida et al. | |
| 5,129,269 A * | 7/1992 | Iizuka et al. | ................. 362/30 |
| 5,510,776 A | 4/1996 | Murphy et al. | |
| 5,703,612 A | 12/1997 | Salmon et al. | |
| 5,709,358 A | 1/1998 | Kubota | |
| 5,975,728 A | 11/1999 | Weyer | |
| 6,158,156 A | 12/2000 | Patrick | |
| 6,382,127 B2 | 5/2002 | Wehner | |
| 6,416,204 B1 | 7/2002 | Cutshaw | |
| 6,765,546 B2 | 7/2004 | Akamine et al. | |

* cited by examiner

*Primary Examiner*—Stephen F Husar
(74) *Attorney, Agent, or Firm*—Harness, Dickey & Pierce, P.L.C.

(57) ABSTRACT

A display device having a display background and a light. The display background has a decorative field into which an indicator is disposed. The light is disposed rearwardly of the display background such that illumination of the light illuminates the indicator to permit a viewer to distinguish between the indicator and a remainder of the decorative field. The indicator forms a portion of the decorative field and is indistinguishable from the remainder of the decorative field when the light is not illuminated. A method for forming a display device is also provided.

11 Claims, 6 Drawing Sheets

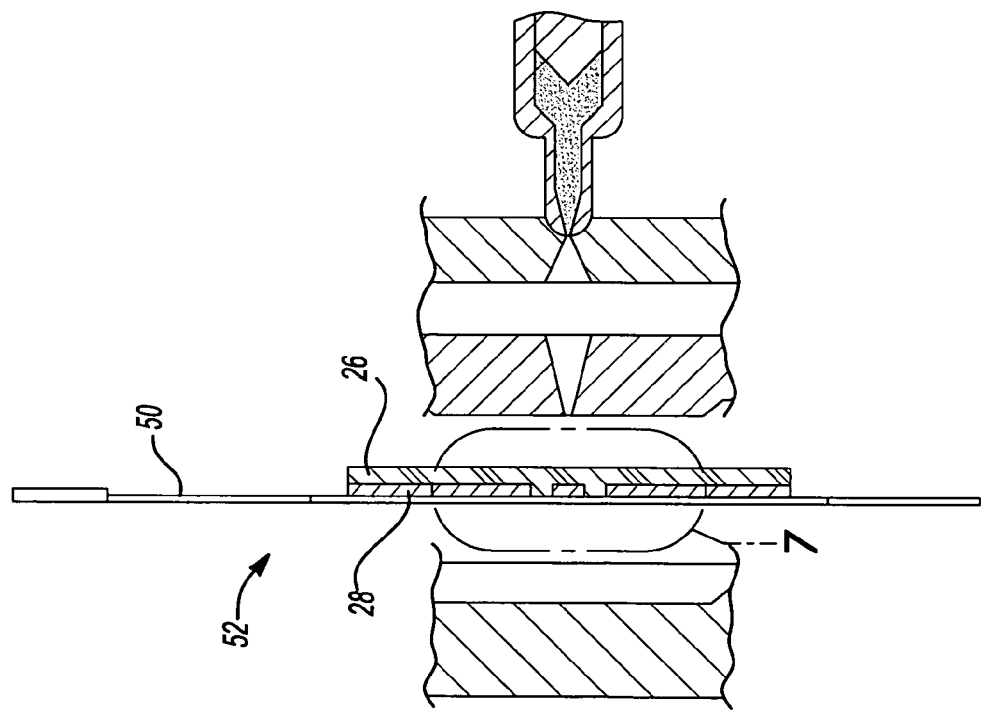
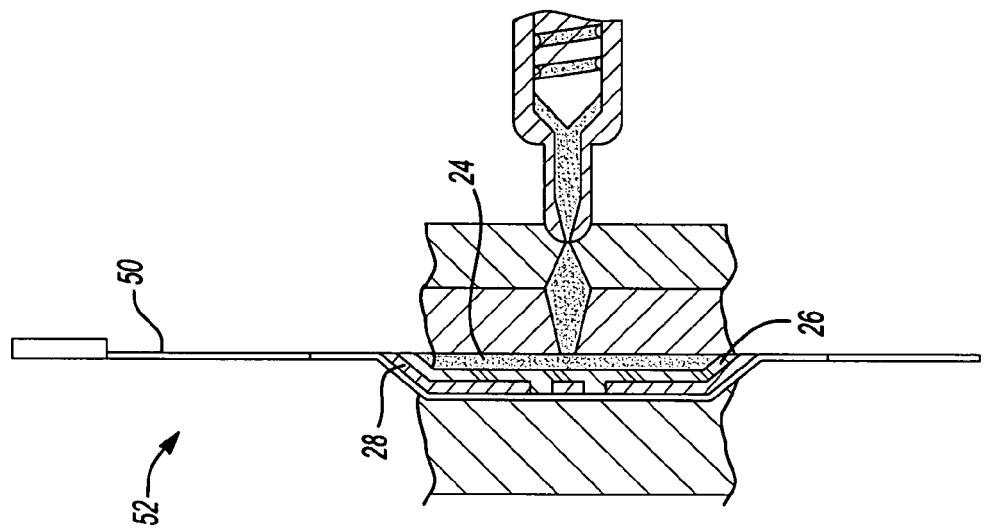

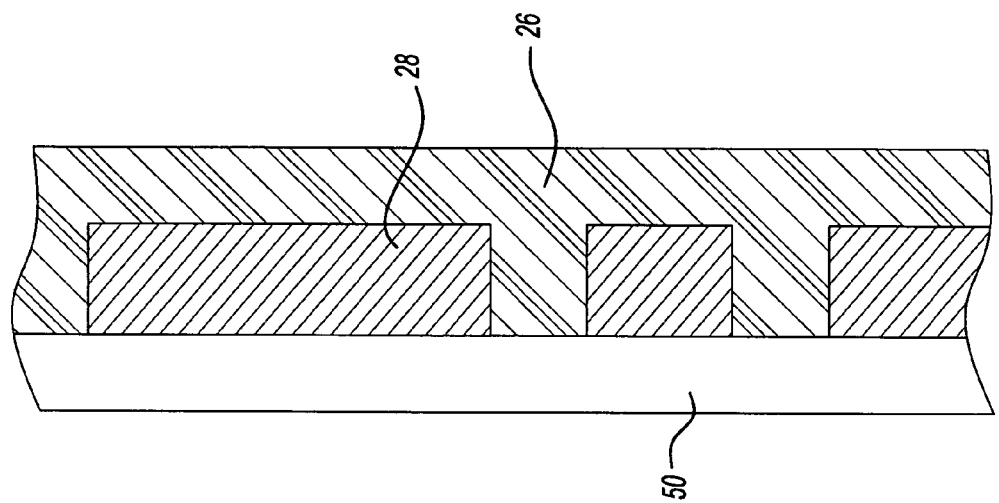
Fig-7
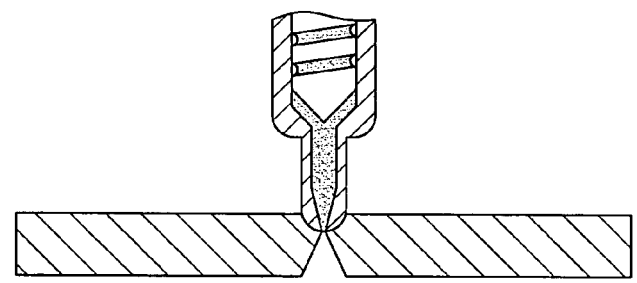
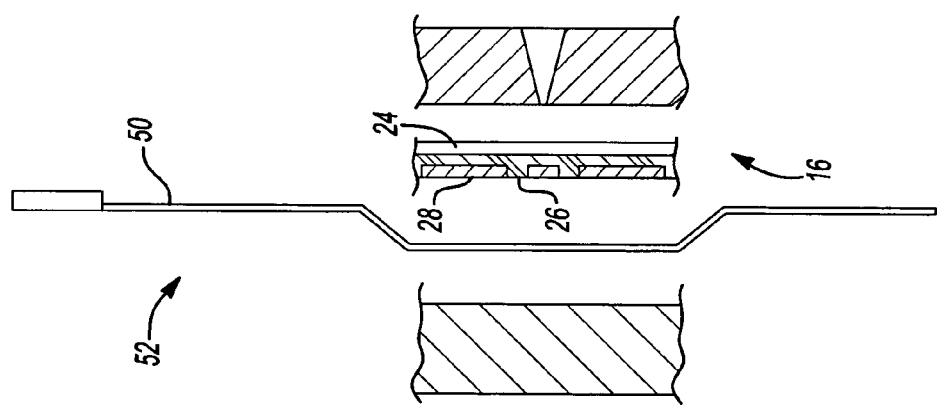
Fig-6

INSTRUMENT CLUSTER WITH HIDDEN TELLTALE INDICATORS

INTRODUCTION

The present invention generally relates to display devices. More particularly, the present invention relates to a display device with a decorative background into which one or more indicators can be disposed and a backlight for selectively illuminating the indicators. From a front side of the display device, the indicators form a portion of the background when the backlight is not illuminated so that the indicators are indistinguishable from a remainder of the background.

In modern automotive vehicles, the instrument panel must provide a means for displaying messages and information to the vehicle operator. Several types of messages and information relate to safety, emissions and/or the status of various vehicle components (e.g., high beam headlights, cruise control operation) and as such, it can be desirable to provide dedicated indicators for each message rather than to provide a multi-functional display that incorporates each of these messages. One drawback of this approach, however, concerns the styling of the instrument panel since a fairly large area must be reserved for the telltale indicators.

It is known in the art to incorporate such telltale indicators into a black background—the back background can comprise all or part of a dial face of a gauge, such as a speedometer or tachometer, or can be an area between a pair of gauges. When the telltale indicator is not illuminated, the contrast between the black background and the telltale indicator is relatively low and consequently, the telltale indicator is not noticed. When this approach is employed and the indicators are disposed between adjacent gauges, however, the styling of the instrument panel can be adversely affected. Specifically, we have found that a large black area between the gauges that is void of decoration detracts from the styling of the instrument panel.

It is also known in the art to incorporate telltale indicators into a non-black but opaque background—the non-black opaque background can comprise all or part of a dial face of a gauge, such as a speedometer or tachometer, or can be an area between a pair of gauges. Unlike the embodiments where a black background is employed, the location of the telltale is readily identifiable when a non-black but opaque background is employed. We have found that the clustering of several telltale indicators that are visible at all times detracts from the styling of the instrument panel.

Accordingly, there remains a need in the art for an improved display wherein indicators can be incorporated into the display in a manner that does not detract from the styling of the display.

SUMMARY

In one form, the present teachings provide a display device having a display background and a light. The display background has a decorative field into which an indicator is disposed. The light is disposed rearwardly of the display background such that illumination of the light illuminates the indicator to permit a viewer to distinguish between the indicator and a remainder of the decorative field. The indicator forms a portion of the decorative field and is indistinguishable from the remainder of the decorative field when the light is not illuminated.

In another form, the present invention provides a display device having a display background and a light that is disposed rearwardly of the display background. The display background includes a decorative field into which an indicator is disposed. The indicator is indistinguishable from the remainder of the decorative field and forms a portion of the decorative field when the light is not illuminated. Illumination of the light illuminates the indicator and permits a viewer to distinguish between the indicator and a remainder of the decorative field.

In yet another form, the present invention provides a method that includes: forming multi-layer member having a semi-transparent material and an opaque material, the semi-transparent material defining a decorative field that is viewed from a first side of the member, the opaque material being disposed on a side of the member opposite the semi-transparent material, the opaque material not covering a portion of the semi-transparent material that defines an indicator; and placing a light rearwardly of the opaque material, the light being configured to selectively illuminate the indicator, the indicator forming a portion of the decorative field and being indistinguishable from a remainder of the decorative field when the light is not illuminated.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

FIGS. 4 through 6 are schematic illustrations of a molding operation that employs an in-molded decoration technique for forming the lens of FIG. 1;

FIG. 7 is an enlarged view of the encircled portion of FIG. 4;

DETAILED DESCRIPTION OF THE VARIOUS EMBODIMENTS

Figure 1:
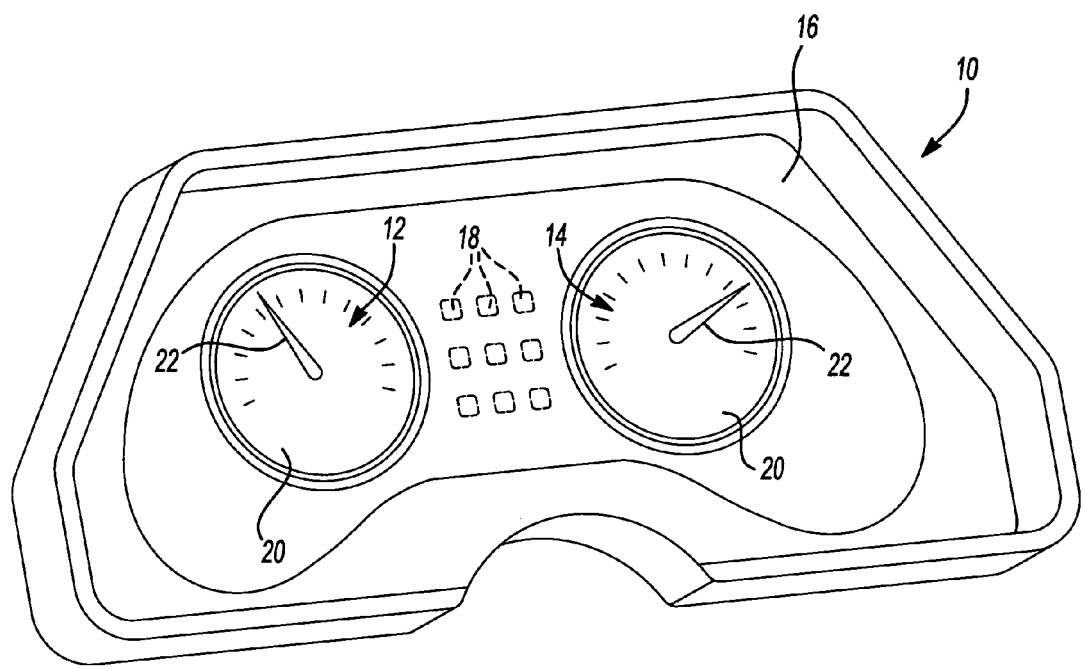
FIG. 1 is a perspective view of a display constructed in accordance with the teachings of the present invention.

With reference to FIG. 1 of the drawings, a display constructed in accordance with the teachings of the present invention is generally indicated by reference numeral 10. The display 10 can include a first gauge 12, a second gauge 14, a lens 16 and one or more backlights 18. In the particular example provided, the first and second gauges 12 and 14 are conventional in their construction and operation and as such, need not be discussed in detail herein. Briefly, the first gauge 12 can be a first type of gauge, such as a speedometer, and the second gauge can be a second type of gauge, such as a tachometer, and can each have a dial face 20 and one or more pointers 22. In the example provided, the dial faces 20 of the first and second gauges 12 and 14 are backlit and the pointers 22 are illuminated. It will be appreciated, however, that the first and second gauges 12 and 14 can be any type of gauge.

Figure 3:
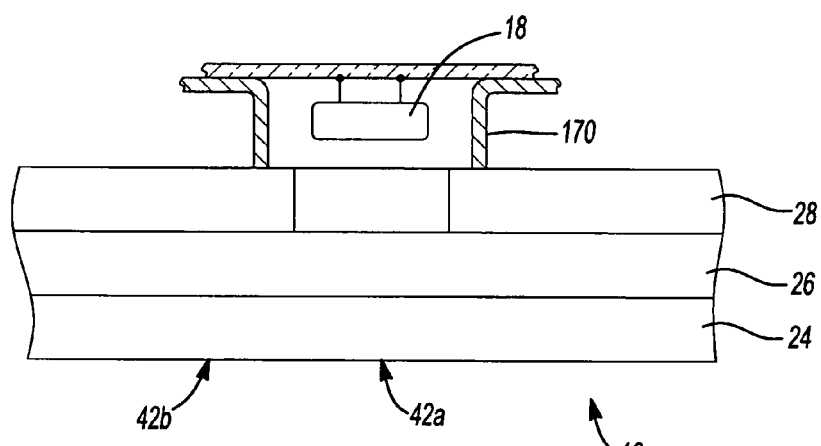
FIG. 3 is a sectional view taken along the line 3-3 of FIG. 2.
Figure 2:
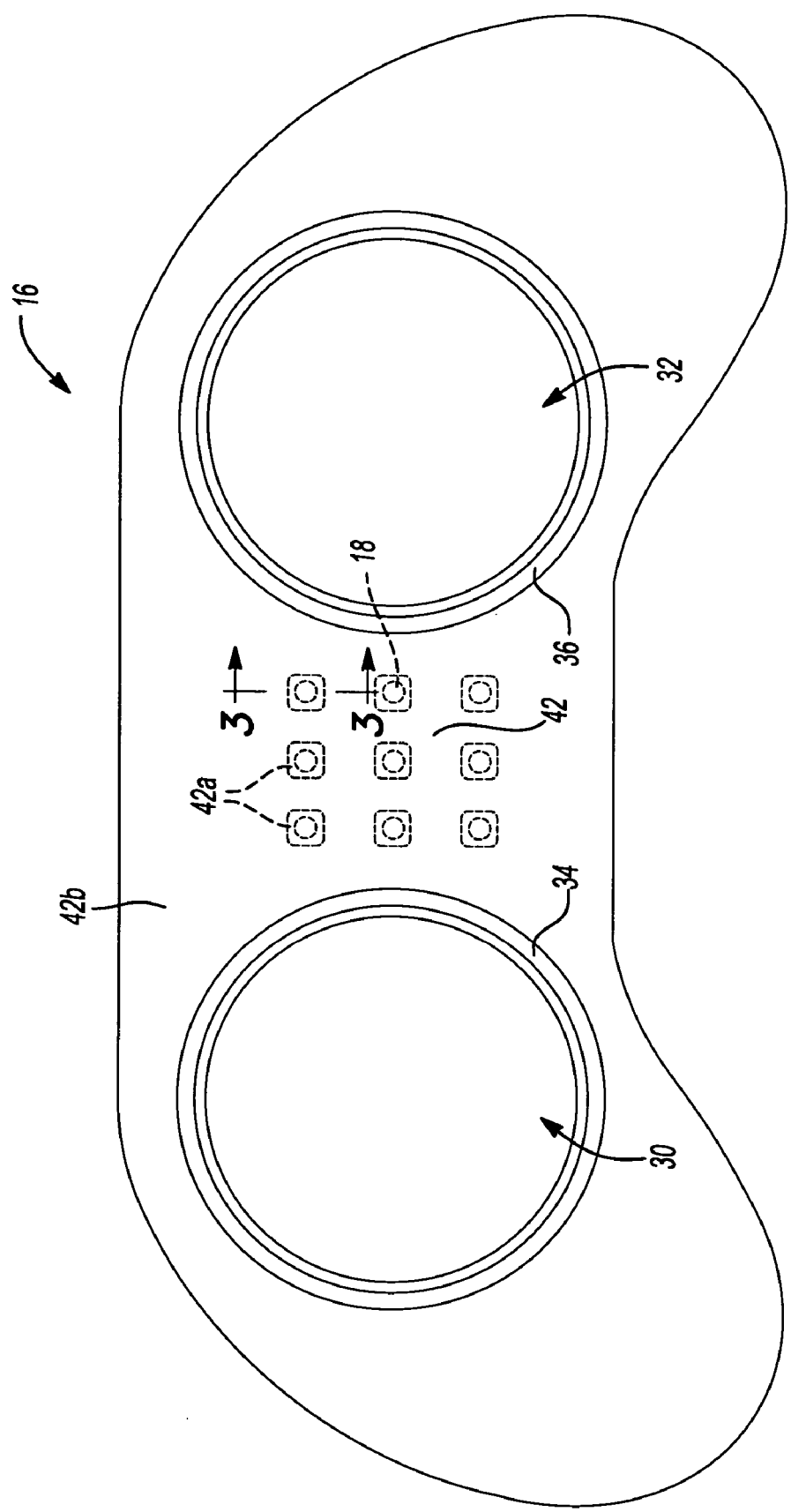
FIG. 2 is a front elevation view of a portion of the display of FIG. 1 illustrating the lens in greater detail.

With additional reference to FIGS. 2 and 3, the lens 16 can include a lens structure 24, a first material 26 and a second material 28. The lens structure 24, first material 26 and second material 28 can form first and second lens portions 30 and 32, respectively, first and second lens borders 34 and 36, respectively, and a decorative field 42. While the first and second materials 26 and 28 are illustrated as being applied to the rearward surface of the lens structure 24 (i.e., so that the decorative field 42 is disposed between the lens structure 24 and the backlights 18, those of ordinary skill in the art can appreciate from this disclosure that the first and second materials 26 and 28 can additionally or alternatively be applied to a forward surface of the lens structure 24 (i.e., so that the lens structure 24 is disposed between the first material 26 and the backlights 18. The first and second lens portions 30 and 32 can be aligned to the first and second gauges 12 and 14 and can be formed of a transparent material that permits one to readily view the dial faces 20 and pointers 22. The first and second lens borders 34 and 36, which are optional, can border an area proximate the first and second lens portions 30 and 32, respectively, and can help to visually separate the first and second gauges 12 and 14 from the decorative field 42.

Figure 2A:
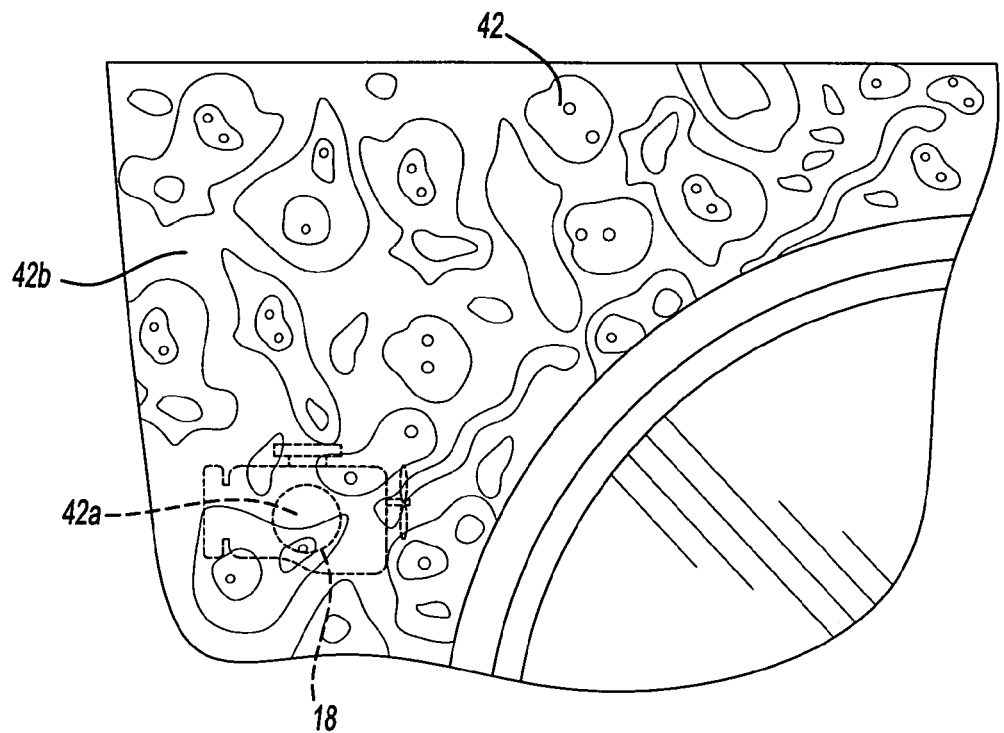
FIG. 2A is an enlarged view of a portion of the display of FIG. 1 with the backlight in an unilluminated condition so that the indicator is hidden.

The first material 26 forms the decorative field and is at least one semi-transparent (translucent) material, such as one or more semi-transparent inks. The decorative field 42 is a visible and decorative portion of the display 10. In its most simple form, the decorative field 42 can have an overall monochromatic appearance but in the particular example provided, is configured to simulate a wood grain, such as a wood burl, which is best shown in FIG. 2A. As those of ordinary skill in the art will appreciate from this disclosure, the decorative field 42 need not be limited to a monochromatic or simulated wood grain appearance, but rather could additionally or alternatively be configured to resemble or simulate any material (e.g., metal, such as polished chrome, brushed nickel or copper, diamond plate aluminum, fabric, leather, stone) or resemble, simulate or form an illustration (e.g., painting, photograph, advertising graphics).

The decorative field 42 can include one or more indicators 42a and a remaining portion 42b. The indicators 42a can be placed in any desired location, but in the example provided are grouped together between the first and second lens portions 30 and 32. Significantly, since the indicators 42a are formed of the first material 26, they form a portion of the decorative field 42 and are indistinguishable from the remaining portion 42b of the decorative field 42 except as described below. The indicators 42a can comprise any combination of alpha and/or numeric characters, symbols, text and/or shapes.

The second material 28 can be an opaque material, such as an ink and/or a metal (e.g., metallic coating, metallic foil) and is positioned rearwardly of the first material 26 in a manner that substantially surrounds the indicators 42a. In the particular example provided, the second material 28 is a silver reflective metallic coating that is applied over the portion of the first material 26 that forms the remaining portion 42b of the decorative field 42, which inhibits the transmission of light through the remaining portion 42b, as well as over the lens structure 24 so as to form the first and second lens borders 34 and 36.

One manner in which the lens 16 can be formed is illustrated in FIGS. 4 through 7. In this example, an IMD process is employed wherein the first and second materials 26 and 28 are applied to (i.e., deposited onto) a carrier film 50 that is indexed into an injection mold 52. The first material 26 can bond or otherwise adhere to the plastic that is injected into the mold 52 to thereby couple the first and second materials 26 and 28 to the structure of the lens 16. When the mold 52 is opened, the carrier film 50 releases from the finished lens 16 and can be indexed as desired while the finished lens 16 is removed from the mold 50.

Figure 8:
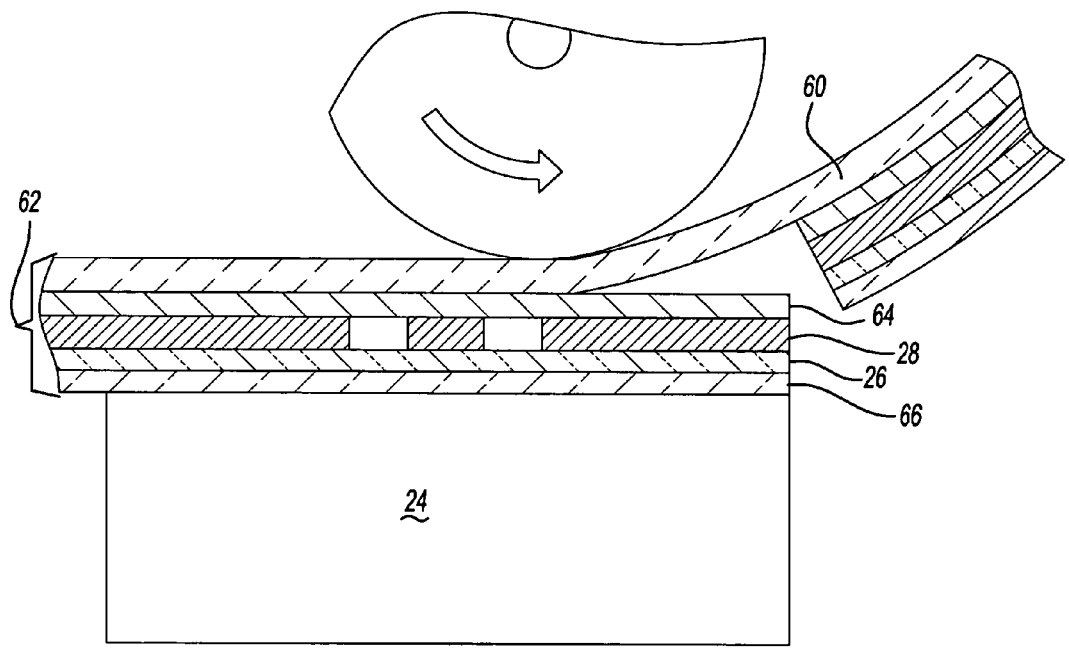
FIG. 8 is a schematic illustration of a heat transfer printing operation for forming a lens similar to that of FIG. 1.
Figure 9:
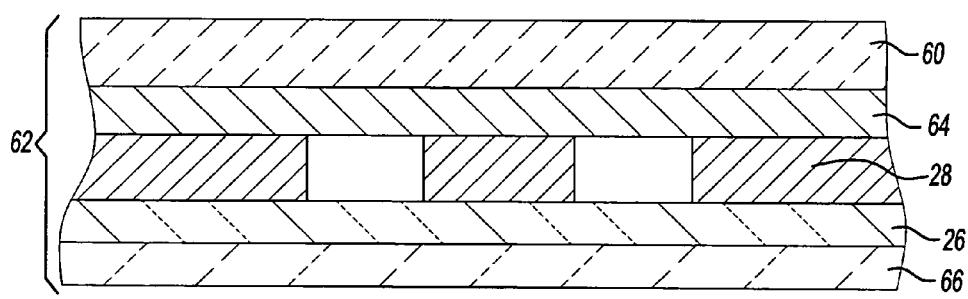
FIG. 9 is an enlarged view of the encircled portion of FIG. 8.

Another process for forming the lens 16 is illustrated in FIGS. 8 and 9. In this example, heat transfer printing is employed to couple the first and second materials 26 and 28 to the structure of the lens 16. Specifically, a carrier film 60 can be employed to carry a decorative member 62 that can comprise a release layer 64, the second material 28, the first material 26 and an adhesive material 66. Heat and pressure can be employed to activate the adhesive material 66 to bond or adhere the decorative member 62 to the structure of the lens 16. Thereafter, the carrier film 60 can be removed from the release layer 64.

Returning to FIGS. 2 and 3, the backlights 18 are disposed rearwardly of the second material 28 (e.g., mounted on a circuit board (not shown) that may be coupled to the lens 16). Each backlight 18 can be selectively operated to selectively illuminate the indicators 42a. A light tunnel 70 can be employed to confine the light that emanates from an indicator 42a of the type that is well known in the art so as to prevent the light from a given indicator 42a from illuminating other areas indicators 42a. Since the indicators 42a are not color neutral, a highly saturated light (i.e., a light with a very narrow spectral width), such as an LED, can be employed for the backlights 18 to prevent color shifting of the light that emanates from the indicators 42a.

Figure 2B:
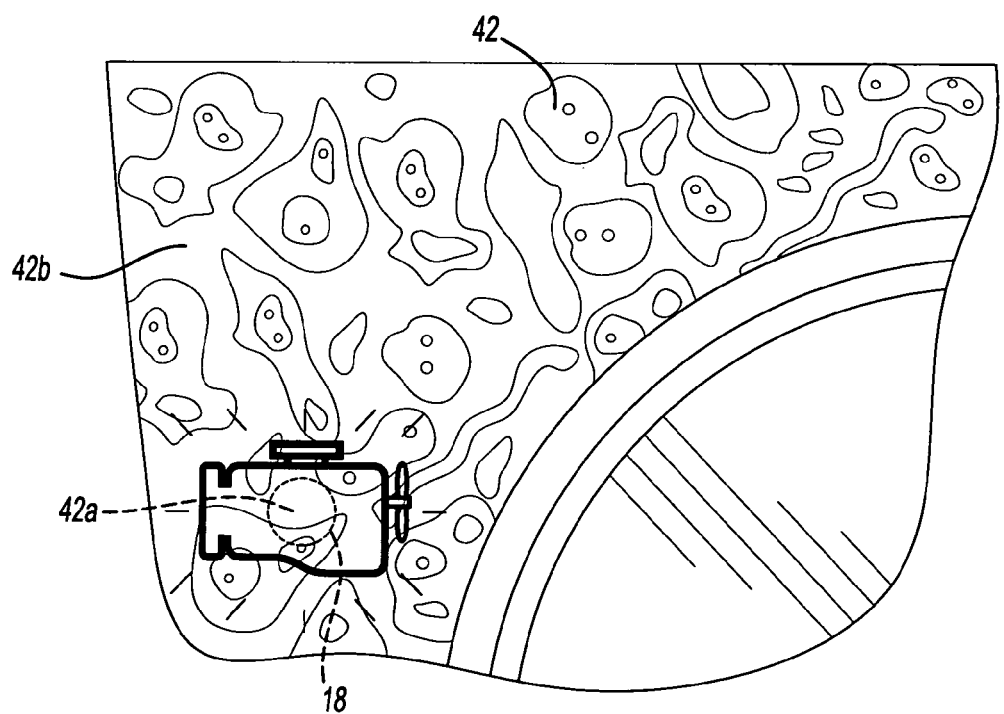
FIG. 2B is a view similar to that of FIG. 2A but illustrating the backlight in an illuminated condition which illuminates an indicator.

With additional reference to FIG. 2A, when the backlights 18 are not lit, the indicators 42a are not noticed because they form a portion of the decorative field 42. Consequently, the indicators 42a do not detract from the styling of the display 10 despite the reservation of a fairly large area for the indicators 42a. Illumination of one or more of the backlights 18, however, illuminates the indicator(s) 42a so that they are readily visible as is shown in FIG. 2B.

While the upper display 10 has been described thus far as including a lens 16 with a decorative field 42 into which one or more indicator 42a can be hidden, it will be appreciated that the invention, in its broader aspects, can be constructed somewhat differently. For example, the decorative field 42 and indicator(s) 42a can be formed on an applique or a mask that can form a portion of a display device.

While the invention has been described in the specification and illustrated in the drawings with reference to various embodiments, it will be understood by those skilled in the art that various changes can be made and equivalents can be substituted for elements thereof without departing from the scope of the invention as defined in the claims. Furthermore, the mixing and matching of features, elements and/or functions between various embodiments is expressly contemplated herein so that one of ordinary skill in the art would appreciate from this disclosure that features, elements and/or functions of one embodiment can be incorporated into another embodiment as appropriate, unless described otherwise, above. Moreover, many modifications can be made to adapt a particular situation or material to the teachings of the invention without departing from the essential scope thereof.

Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A display device comprising:
    a display background having a first portion and a second portion, the first portion being formed of a semi-transparent material and forming a decorative field, the second portion being formed of an opaque material, the second portion being coupled to a rearward side of the first portion and covering all but a predetermined area; and
    a selectively operable light source disposed rearwardly of the second portion of the display background;
    wherein from a front side of the display device the predetermined area is indistinguishable from the decorative field when the light source is not illuminated, wherein from a front side of the display device the predetermined area is illuminated when the light source is illuminated, wherein the opague material includes a metal, and wherein the metal is a metal foil or a metal coating.

2. The display device of claim 1, wherein the semi-transparent material includes at least one ink.

3. The display device of claim 1, wherein the light source is a highly saturated light source.

4. The display device of claim 3, wherein the light source is an LED.

5. The display device of claim 1, wherein the predetermined area defines a display indicia that includes at least one of a numeric character, a text message and a symbol.

6. The display device of claim 1, further comprising at least one gauge and wherein the display background is disposed at least partially about the gauge.

7. The display device of claim 6, wherein the display background is disposed about a pair of gauges and the predetermined area is located between the gauges.

8. A method comprising:
    forming multi-layer member having a carrier film, a semi-transparent material and an opaque material, the semi-transparent material and the opaque material being deposited onto the carrier film, the semi-transparent material defining a decorative field that is viewed from a first side of the member, the opaque material being disposed on a side of the member opposite the semi-transparent material, the opaque material not covering a portion of the semi-transparent material that defines an indicator;
    coupling the multi-layer member to a lens;
    removing the carrier film after the multi-layer member is coupled to the lens; and
    placing a light rearwardly of the opaque material, the light being configured to selectively illuminate the indicator, the indicator forming a portion of the decorative field and being Indistinguishable from a remainder of the decorative field when the light is not illuminated.

9. The method of claim 8, wherein coupling the multi-layer member to the lens includes:
    indexing the multi-layer member into an injection mold; and
    injecting a plastic into the injection mold to form the lens and couple the lens to the multi-layer member.

10. The method of claim 8, wherein the multi-layer member further comprises an adhesive.

11. The method of claim 10, wherein coupling the multi-layer member to the lens includes applying at least one of heat and pressure to at least one of the multi-layer member and the lens.

* * * * *